(12) United States Patent
Suzuki

(10) Patent No.: US 6,330,239 B1
(45) Date of Patent: Dec. 11, 2001

(54) EXCHANGE APPARATUS FOR EXCHANGING DATA BETWEEN AN ASYNCHRONOUS TRANSFER MODE NETWORK AND AN INTERNET PROTOCOL COMMUNICATION NETWORK

(75) Inventor: Yuichi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/115,539

(22) Filed: Jul. 15, 1998

(30) Foreign Application Priority Data

Jul. 15, 1997 (JP) .................................................. 9-189574

(51) Int. Cl.[7] .................................................. H04L 12/28
(52) U.S. Cl. .......................... 370/395; 370/397; 370/399
(58) Field of Search .................................... 370/395, 397, 370/399, 400, 392, 409, 355, 389

(56) References Cited

U.S. PATENT DOCUMENTS

| 5,490,141 | * | 2/1996 | Lai et al. ............................. 370/60.1 |
| 5,748,626 | * | 5/1998 | Esaki et al. .......................... 370/355 |
| 6,137,798 | * | 10/2000 | Nishihara et al. ................... 370/392 |

FOREIGN PATENT DOCUMENTS

| 8-189574 | 7/1996 | (JP) . |
| 9-107377 | 4/1997 | (JP) . |
| 10-023072 | 1/1998 | (JP) . |
| 96/06493 | 2/1996 | (WO) . |

OTHER PUBLICATIONS

Computer & Network LAN, 1996, vol. 14 No. 10, pp. 2–6.
Data Process Research Publication; 96–DPS–78; vol. 96, No. 95, pp. 79–84.

* cited by examiner

Primary Examiner—Wellington Chin
Assistant Examiner—Brenda H. Pham
(74) Attorney, Agent, or Firm—Foley & Lardner

(57) ABSTRACT

An exchange apparatus is disclosed, that comprises an address solving port for extracting logical address information from a datagram received from an Internet protocol computer network through a data transmission path and converting the extracted address information into absolute address information of an asynchronous transfer mode network, an address converting port for converting the absolute address information converted by the address solving port into an address having a geographically hierarchical structure and adding the converted address information to the original datagram, an ATM cell assembling port for assembling an ATM cell that is transferred at a time in the asynchronous transfer mode with the data gram containing the address information added by the address converting port, and a transfer destination setting and outputting port for setting a virtual path and a virtual channel that represent the transfer destination to the ATM cell assembled by the ATM cell assembling port and outputting the resultant ATM cell to the asynchronous transfer mode network.

14 Claims, 11 Drawing Sheets

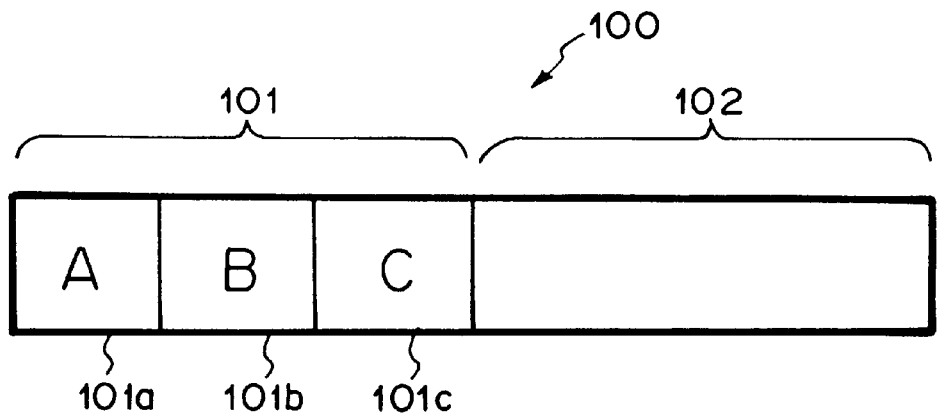
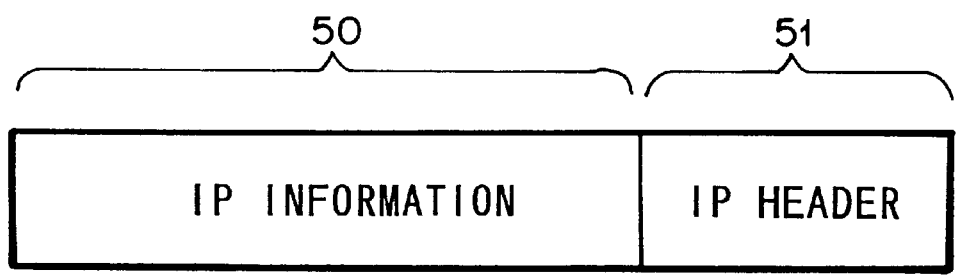
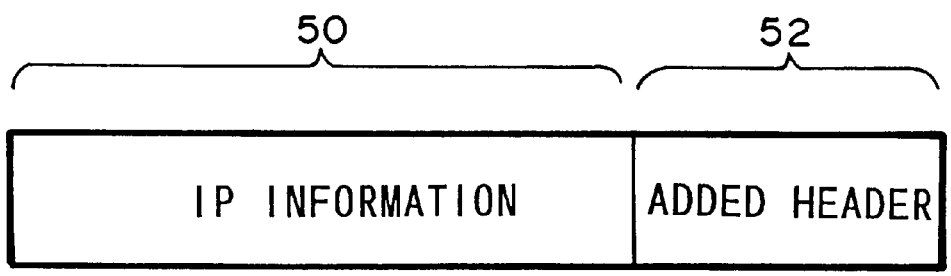

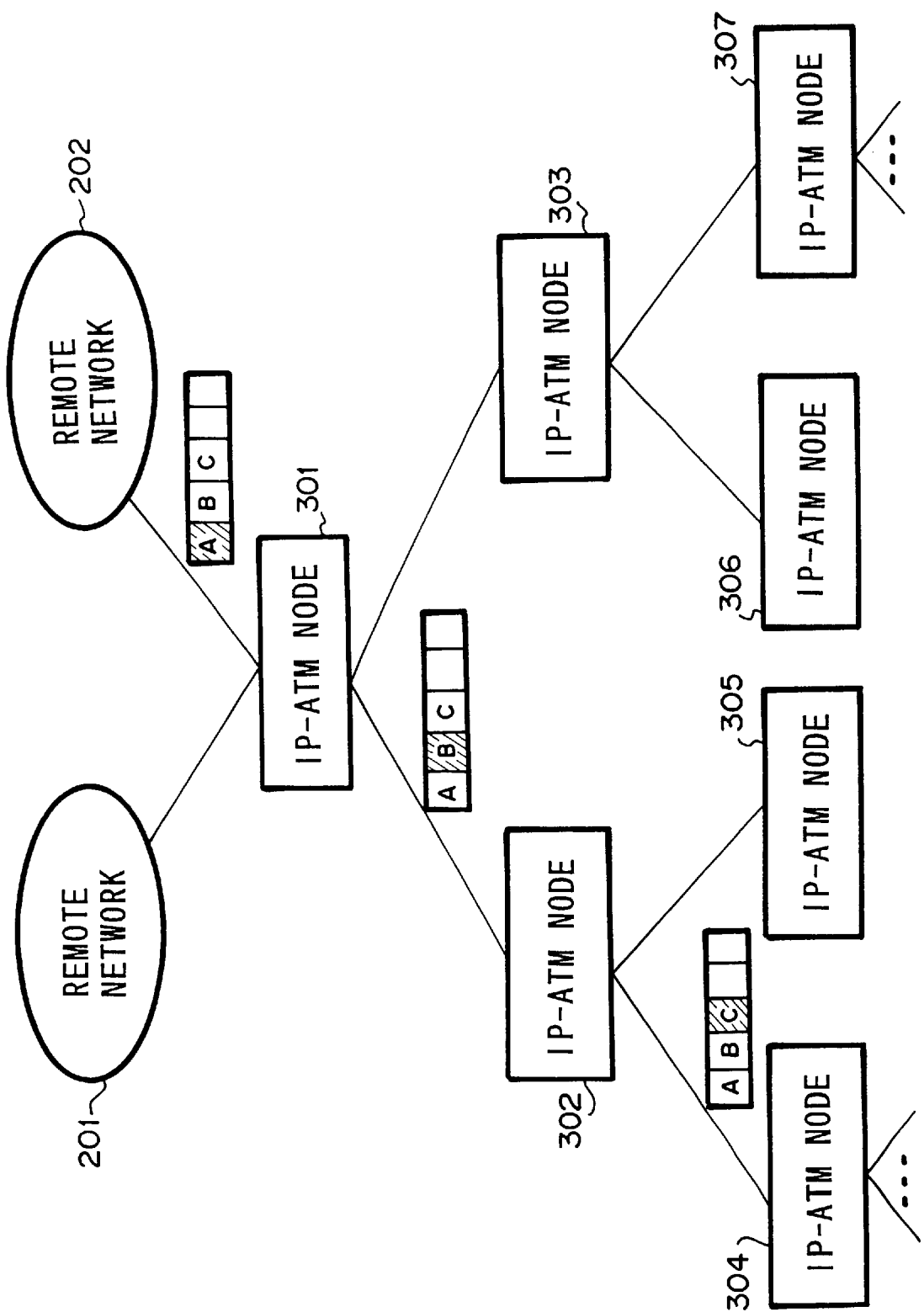

EXCHANGE APPARATUS FOR EXCHANGING DATA BETWEEN AN ASYNCHRONOUS TRANSFER MODE NETWORK AND AN INTERNET PROTOCOL COMMUNICATION NETWORK

BACKGROUND OF THE INVENTION

1. Field of the Invention

The present invention relates to an exchange apparatus for exchanging data between an asynchronous transfer mode network and an Internet protocol communication network.

2. Description of the Related Art

In recent years, as Internet is growing, the scale and area thereof are drastically becoming large and affect the architecture thereof not a little. Particularly, with respect to a fundamental protocol of Internet (referred to as Internet protocol (IP)), such a drastic growth results in many problems for example shortage of addresses, tremendous increase of path information, and expandability of functions to new fields.

To solve such problems, the Internet Community has evaluated the next generation Internet protocol IPv6 against the current Internet protocol IPv4. The Internet protocol IPv6 is a datagram type communication protocol. The Internet protocol IPv6 has a path control function as a basic function. The Internet protocol IPv6 corresponds to a network layer of a protocol stack and is a fundamental protocol of Internet.

The Internet protocol IPv6 has been technically evaluated in IETF (Internet Engineering Task Force) that is an open committee of the Internet. The results evaluated in IETF are published to the Internet community as systems called RFC (Request For Comments) and Internet Draft that are official documents on Internet. As actual evaluation items of the Internet protocol IPv6, there are (1) expansion of address space from 32 bits to 128 bits, (2) simplified process due to simplification of header format, (3) easiness of functional expansion and enhancement of security function with expanded header, (4) functions corresponding to new services such as mobile host, multi-cast communication, real-time communication, and play & plug, and (5) easy upgrade from IPv4 to IPv6.

FIG. 13 shows a conventional packet format of data transferred in asynchronous transfer mode (ATM). Packet data 100' in an ATM network is composed of an address portion 101' and an information portion 102'. The address portion 101' stores information that represents a transfer destination as represented by "abc". The information portion 102' stores main information to be transferred. In other words, with reference to the transfer destination information stored in the address portion 101', the packet data 100' is successively transferred. Thus, information stored in the information portion 102' can be transferred to the desired transfer destination.

FIG. 14 shows the structure of an ATM network. FIG. 14 shows connections of remote networks and nodes. Remote networks 201' and 202' are connected to an ATM node 301' disposed at the vertex of a plurality of ATM nodes 301' to 307' in a tree shape. When the packet data 100' shown in FIG. 13 is transferred, the ATM nodes 301' to 307' recognize the address information "abc" in the address portion 101' of the packet data 100' and transfers the packet data 100' to the transfer destination corresponding to the address information "abc".

To widely use a network, an ATM network and a network corresponding to the Internet protocol (hereinafter referred to as IP network) may be connected. To connect the ATM network and the IP network and transfer a datagram of the IP network (hereinafter referred to as IP datagram) in the ATM network, the address in the ATM network (hereinafter referred to as ATM address) and the address in the IP network (hereinafter referred to as IP address) should be correlated.

To do that, an address table having ATM addresses and IP addresses corresponding thereto is provided. With reference to the table data, an address is converted between the ATM network and the IP network. Thus, a desired IP datagram is transferred. In this case, to allow a transfer destination router to transfer an IP datagram, the transfer destination router should know the location of the receiving party. Consequently, all routers should have table information of all paths from a particular transfer destination to a final transfer destination.

However, in a conventional address converting apparatus, to transfer an IP datagram between an ATM network and an IP network that have different protocols, an ATM address should be solved (obtained) from an IP address. Thus, the following problems take place.

In other words, to solve (obtain) an address in the ATM network or route an IP datagram, the Internet protocol should be assembled with an ATM cell. In other words, an address of the IP network should be solved (obtained) in the Internet protocol layer. In addition, since table information that correlates ATM addresses and IP addresses of all users is required, an address converting apparatus such as an IP-ATM connecting exchange apparatus requires a memory or an external storing unit that stores table information that correlates ATM addresses and IP addresses of all users.

Only with address information of a communication party, since the location of an address converting apparatus such as an IP-ATM exchange apparatus and an IP-ATM connecting exchange apparatus as a transfer destination cannot be obtained, thus, all address converting apparatuses should have table information that represents connection paths among other IP-ATM exchange apparatuses and IP-ATM connecting exchange apparatuses. In addition, to identify a communication quality requested by a user and a communication group, a special communication procedure or a special protocol is required. Alternatively, the network side should register users. However, it is very difficult to identify a communication quality requested by a user, provide a proper path and a proper bandwidth for transferring an IP datagram, and identify a CUG (Closed Users Group) of a user for selecting a proper communication party and transferring an IP datagram thereto.

However, in a capsulization such as Internet engineering task force RFC1483 of the Internet protocol IPv6, an address assignment for an ATM network is not considered. An interface between an IP network and an ATM network and new routing services (such as QoS) have not been accomplished. Thus, in the Internet protocol IPv6, there are problems with respect to the IP network and ATM network as with the Internet protocol IPv4. When an IP datagram is transferred, the service quality, bandwidth, real time communication, and so forth are not assured. In particular, in the IP network, when the next address of a particular address is a domain name used in a far country, a routing process becomes complicated.

SUMMARY OF THE INVENTION

An object of the present invention is to provide an exchange apparatus that securely converts an address with a small amount of information and assures and expands services.

A first aspect of the present invention is an exchange apparatus, comprising an address solving means for extracting logical address information from a datagram received from an Internet protocol computer network through a data transmission path and converting the extracted address information into absolute address information of an asynchronous transfer mode network, an address converting means for converting the absolute address information converted by the address solving means into an address having a geographically hierarchical structure and adding the converted address information to the original datagram, an ATM cell assembling means for assembling an ATM cell that is transferred at a time in the asynchronous transfer mode with the data gram containing the address information added by the address converting means, and a transfer destination setting and outputting means for setting a virtual path and a virtual channel that represent the transfer destination to the ATM cell assembled by the ATM cell assembling means and outputting the resultant ATM cell to the asynchronous transfer mode network.

A second aspect of the present invention is an exchange apparatus, comprising an address solving means for extracting address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information, a datagram assembling means for assembling a datagram in an ATM adaptation layer with the ATM cell whose address has been solved by the address solving means, and a transfer destination setting and outputting means for setting a virtual path and a virtual channel that represent the transfer destination for the ATM cell assembled by the datagram assembling means and outputting the resultant ATM cell to the Internet protocol computer network.

A third aspect of the present invention is an exchange apparatus, comprising a first address solving means for extracting logical address information from a datagram received from an Internet protocol computer network through a data transmission path and converting the extracted address information into absolute address information of an asynchronous transfer mode network, an address converting means for converting the absolute address information converted by the first address solving means into an address having a geographically hierarchical structure and adding the converted address information to the original datagram, an ATM cell assembling means for assembling an ATM cell that is transferred at a time in the asynchronous transfer mode with the data gram containing the address information added by the address converting means, a first transfer destination setting and outputting means for setting a virtual path and a virtual channel that represent the transfer destination to the ATM cell assembled by the ATM cell assembling means and outputting the resultant ATM cell to the asynchronous transfer mode network, a second address solving means for extracting address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information, a datagram assembling means for assembling a datagram in an ATM adaptation layer with the ATM cell whose address has been solved by the second address solving means, and a second transfer destination setting and outputting means for setting a virtual path and a virtual channel that represent the transfer destination for the ATM cell assembled by the datagram assembling means and outputting the resultant ATM cell to the Internet protocol computer network.

The address converting means converts solved (obtained) address information into address information with a hierarchical structure defined in E.164 or address information based thereon. In addition, the content of a header portion field of the Internet protocol IPv6 is labeled for a special transfer process of a datagram as in RSVP and real time service. Moreover, when the content of the header portion field is applied to the ATM and a virtual channel thereof is designated, it is used corresponding to the type of QoS and a parameter thereof. In addition, the content of the header portion field may be applied to QoS routing information.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a schematic diagram showing the concept of the format of packet data transferred in a hybrid network of an ATM network and an IP (Internet Protocol) network;

FIG. 2 is a schematic diagram showing the structure of the hybrid network;

FIG. 3 is a schematic diagram showing the concept of the format of packet data transferred on the IP network side in the hybrid network;

FIG. 4 is a schematic diagram showing the concept of the format of packet data transferred on the ATM network side in the hybrid network;

DESCRIPTION OF THE PREFERRED EMBODIMENTS

Figure 5:
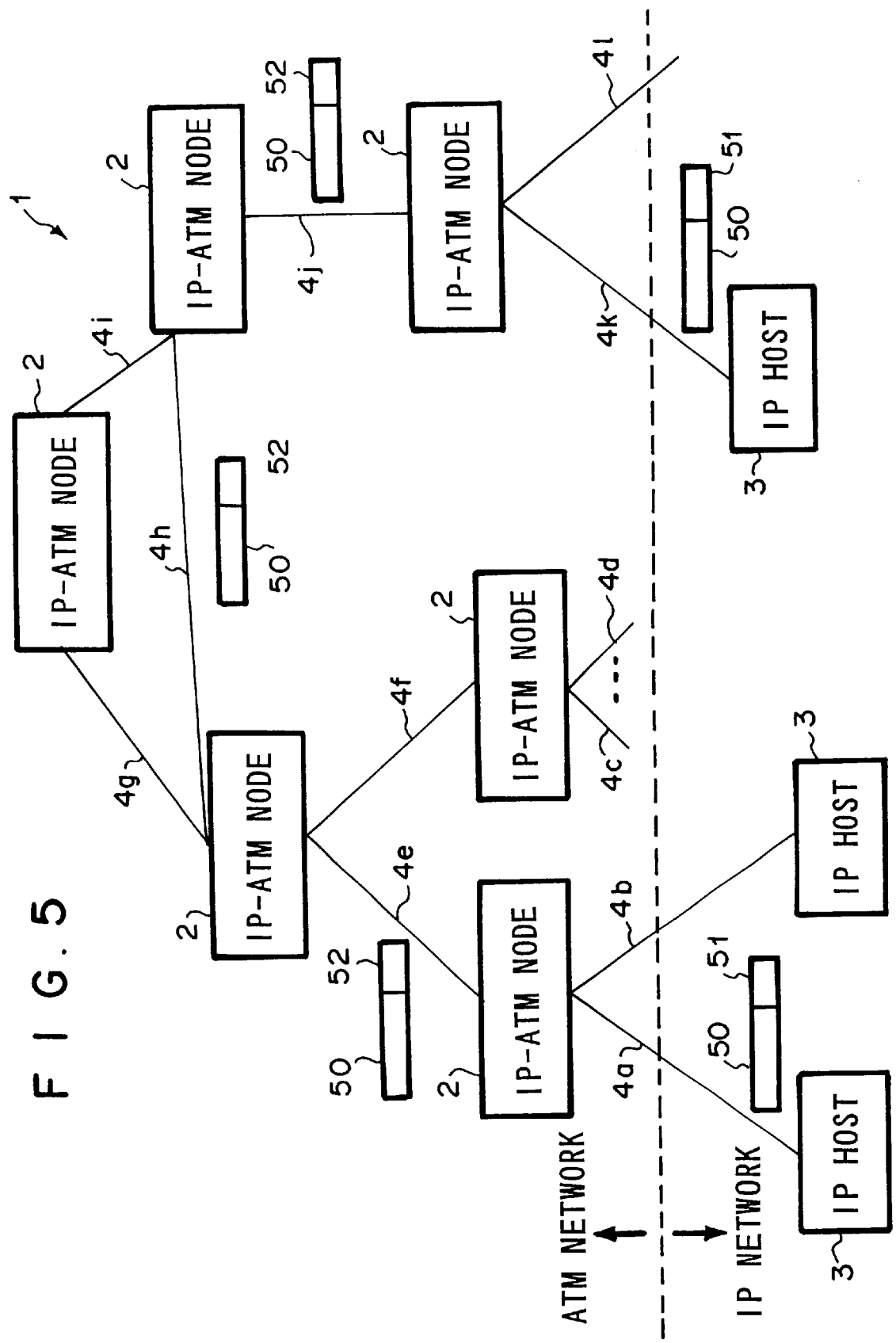
FIG. 5 is a schematic diagram showing the concept of the structure of the hybrid network in the case that an exchange apparatus according to the present invention is applied.

FIG. 1 shows the concept of the format of packet data to be transferred in a hybrid network of an ATM network and an IP network. Packet data 100 used in an IP-ATM node that is an exchange apparatus according to the present invention is composed of an address portion 101 and an information portion 102. The address portion 101 stores transfer destination information denoted by for example "A", "B", and "C". The information portion 102 stores main information to be transferred. Information stored in the address portion 101 hierarchically represents geographical location information of IP-ATM nodes as detailed addresses in the order of "A", "B", and "C".

FIG. 2 shows an outlined structure of a hybrid network of an ATM network and an IP network. Remote networks 201 and 202 are connected to an IP-ATM node 301 at the vertex of a plurality of IP-ATM nodes 301 to 307 in a tree shape. When the packet data 100 with the structure shown in FIG. 1 is transferred, the packet data 100 is transferred to the IP-ATM node 301 corresponding to the address information "A" in the A hierarchical level. The IP-ATM node 301 determines whether or not the address information in the A hierarchical level assigned thereto matches the address information "A" of the packet data 100. When they match, the address information "B" is solved (obtained) from the packet data 100 and the packet data 100 is transferred to the IP-ATM node 302 with the address information "B" in the B hierarchical level.

Next, the IP-ATM node 302 determines whether or not the address information in the B hierarchical level assigned thereto matches the address information "B" of the packet data 100. When they match, the address information in the C hierarchical level is solved (obtained) and the packet data 100 is transferred to the IP-ATM node 304 with the address "C" in the C hierarchical level. The IP-ATM node 304 determines whether or not the address information in the C hierarchical level assigned thereto matches the address information "C" of the packet data 100. When they match, IP packet data is assembled with ATM packet data. Address information of the IP packet is solved (obtained) and the IP packet is transferred to an IP network corresponding to the address information.

In addition, according to the present invention, an ATM address (according to CCITT Recommendation) is designated with an ISDN address defined in E.164 (Recommendation I.331: Numbering plan for the ISDN era). On the other hand, when an IP address composed of an ISDN number and an ISDN sub-address is mapped to an address format of the Internet protocol IPv6 so that the IP address is correlated with E.164. In other words, IP-ATM nodes such as IP-ATM exchange apparatuses and IP-ATM connecting exchange apparatuses are addressed corresponding to an address system having a geographical hierarchical structure. Thus, when an ATM address is solved (obtained) with an IP address, a geographical location of a communication party can be obtained. Consequently, data can be immediately transferred to the transmission party. In particular, since an IP address that is free of a geographical restriction is geographically hierarchized, the IP address can be searched at high speed. Data can be quickly routed to the communication party. Thus, the overall connecting process is alleviated.

In addition, since correlated address information is hierarchized, address information and table data of routing information are distributively managed. Thus, the data amount of the address information and the routing information can be reduced. In addition, when the address information contains communication quality identification information and CUG identification information, QoS control and CUG service can be accomplished in the ATM network without need to provide a special protocol on the user side.

Next, with reference to the accompanying drawings, embodiments of the present invention will be described.

FIG. 3 is a schematic diagram showing the concept of the format of packet data transferred on the IP network side of a hybrid network composed of an ATM network and an IP network in the case that an exchange apparatus according to the present invention is used. The packet data transferred on the IP network side is composed of IP information 50 and an IP header 51 that will be described later. FIG. 4 is a schematic diagram showing the concept of the format of packet data transferred on the ATM network side of the hybrid network in the case that the exchange apparatus according to the present invention is applied. The packet data transferred on the ATM network side is composed of IP information 50 and an added header 52 that will be described later.

FIG. 5 is a schematic diagram showing the structure of a hybrid network 1 in the case that the exchange apparatus according to the present invention is used. Referring to FIG. 5, the hybrid network 1 is composed of a plurality of IP-ATM nodes (exchange apparatuses) 2 and a plurality of IP hosts 3 that are connected through network communication paths 4a to 4l.

The IP-ATM node 2 is a primary structural portion that structures the ATM network. The IP-ATM node 2 has a self routing function, a multiplexing function, and a path switching function. With the self routing function, the IP-ATM node 2 autonomously selects a transfer destination and a data transmission path corresponding to a virtual path identifier (VPI) and a virtual channel identifier (VCI) that are designated beforehand. With the multiplexing function, the IP-ATM node 2 mutually connects transmission paths, demultiplexes a multiplexed signal to signals transferred to a plurality of transmission paths, and multiplexes signals received from a plurality of transmission paths to one signal. With the path switching function, the IP-ATM node 2 switches the current path to another path in the case that the current path gets defective or congested.

In addition, the IP-ATM node 2 has a data converting function and an address converting function. With the data converting function, the IP-ATM node 2 converts an IP datagram received from an IP host 3 into packet data in AAL (ATM Adaptor Layer) handled in the ATM network. With the address converting function, the IP-ATM node 2 converts an address of an ISDN (Integrated Services Digital Network) having a geographically hierarchical structure into an address of an original IP datagram as an added header. In the ATM network, the IP-ATM node 2 performs a transferring process corresponding to the address of the added header portion. Thus, the final transfer destination IP-ATM node 2 in the ATM network extracts an IP datagram from a received AAL packet and transfers the IP datagram to the transfer destination IP host 3.

Each IP host 3 transmits and receives an IP datagram in the IP network. When the IP hosts 3 are connected to the IP-ATM nodes 2 in the ATM network, data can be transmitted/received between the IP network and the ATM network. Next, the format of an added header of packet data transferred on the ATM network side in the hybrid network shown in FIG. 5 will be described in details.

Figure 6:
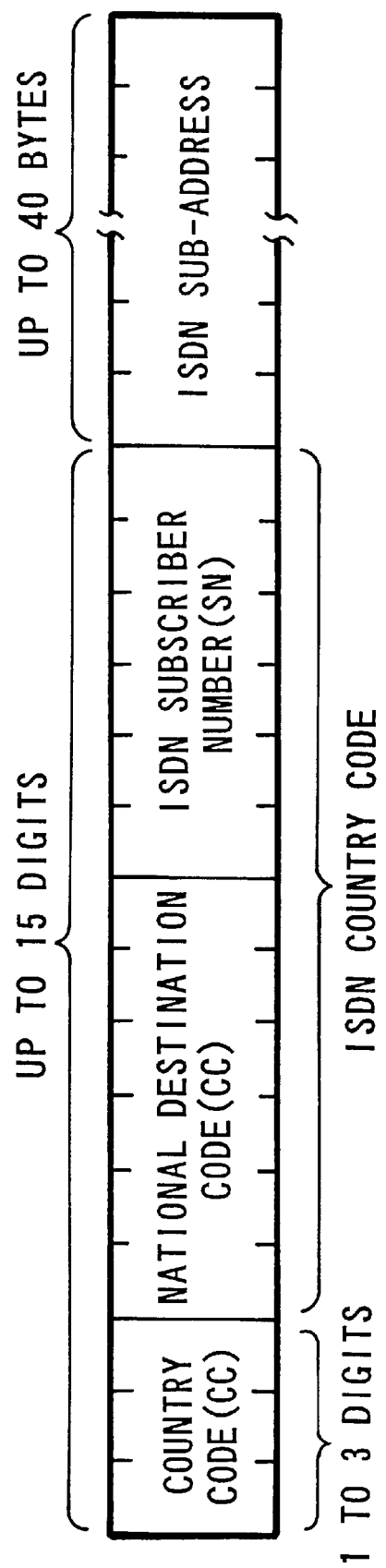
FIG. 6 is a schematic diagram showing the format of an address of an integrated services digital network defined in E.164.

FIG. 6 shows the format of an ISDN address defined in E.164. The ISDN address defined in E.164 is composed of country code (CC), national destination number (NDC), ISDN subscriber number (SN), and 40-digit ISDN sub-address that are arranged in the order. The country code (CC) allows a country to be identified. The national destination number (NDC) allows a particular region of the country to be identified. The ISDN subscriber number (SN) and the ISDN sub-address allow a terminal in the particular region to be identified.

Figure 7:
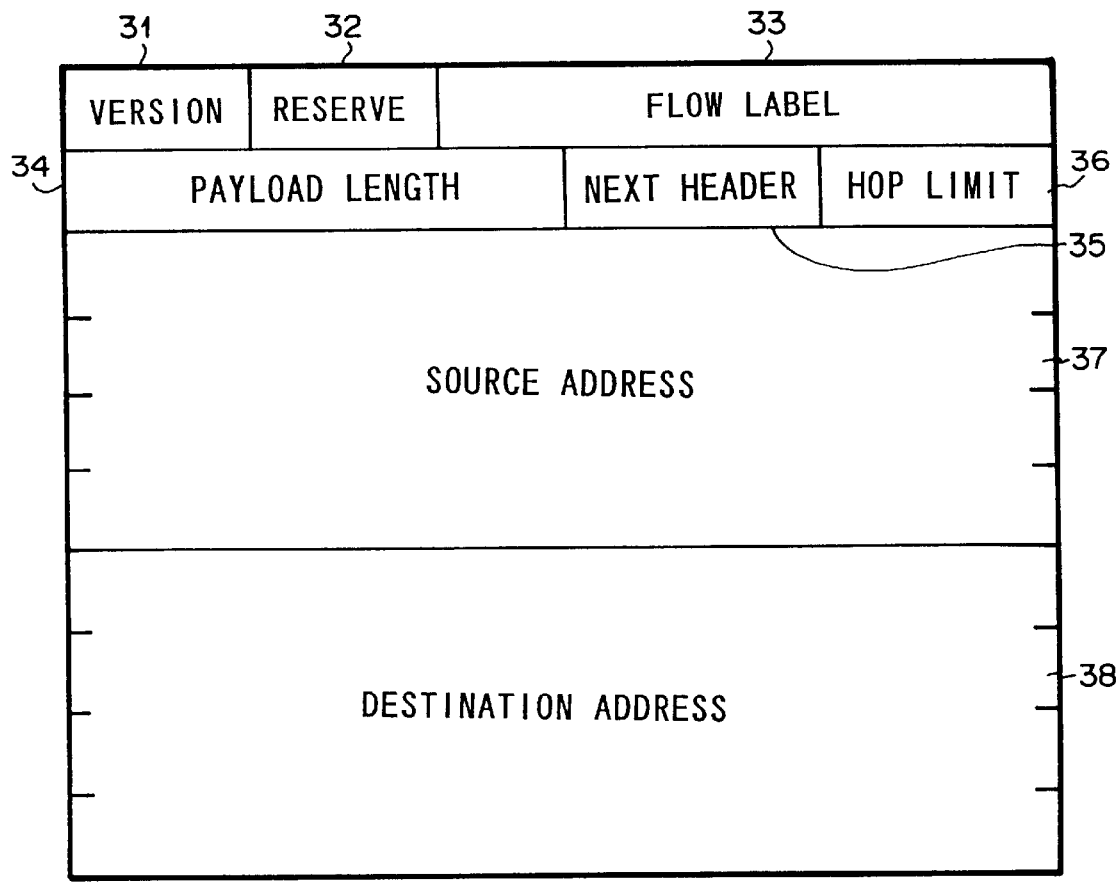
FIG. 7 is a schematic diagram showing the format of a basic header of next generation Internet protocol IPv6.

FIG. 7 shows the format of a basic header of the Internet protocol IPv6. The basic header of the Internet protocol IPv6 is composed of version information region 31, reserve information region 2, flow label information region 33, payload length information region 34, next header information region 35, hop limit information region 36, source address information region 37, and destination information region 38 that are arranged in the order. The version information region 31 represents the version of the Internet protocol. The flow label information region 33 allows a flow to which a packet belongs to be identified. The payload length information region 34 represents the size of the data portion of a packet. The next header information region 35 represents the option header preceded by the IP header. The hop limit information region 36 represents the number of hops. The source address information region 37 represents an address of the data transfer side. The destination information region 38 represents an address of the data receiver side.

Figure 8:
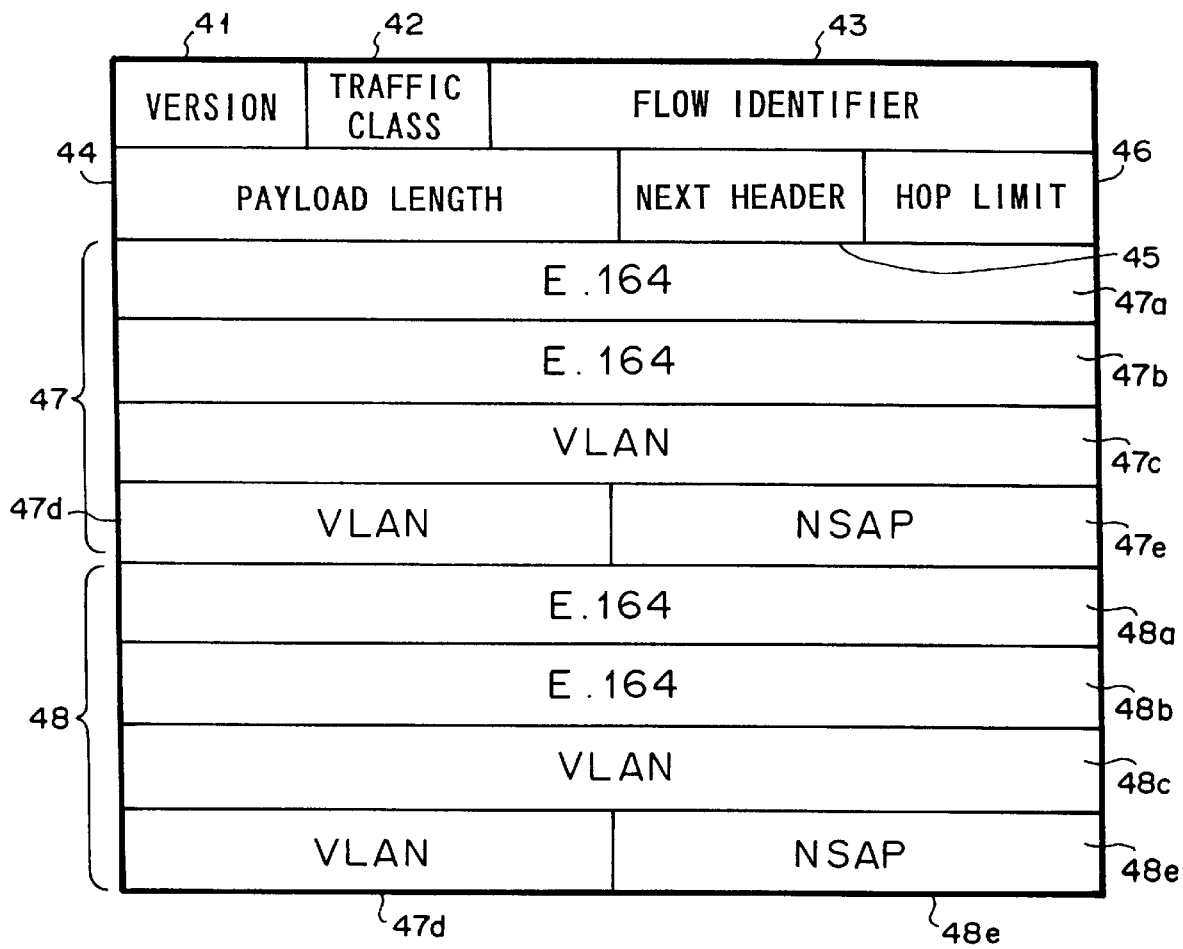
FIG. 8 is a schematic diagram showing the format of an address header assigned in an IP-ATM node according to an embodiment of the present invention.

FIG. 8 shows the format of the added header corresponding to the embodiment of the present invention. The format of the added header of packet data transferred in the ATM network is similar to the basic header of the Internet protocol IPv6. The added header is composed of version information region 41, traffic class information region 42, flow label information region 43, payload length information region 44, next header information region 45, hop limit information region 46, source address information region 47, and destination information region 48 that are arranged in the order. The version information region 41 represents the version of the Internet protocol. The traffic class information region 42 represents the class of the traffic. The flow label information region 43 represents an identifier of a flow to which the packet belongs. The payload length information region 44 represents the size of the data portion of the packet. The next header information region 45 represents an option header preceded by the IP header. The hop limit information region 46 represents the number of hops. The source address information region 47 represents the address of the data transmitter side. The destination information region 48 represents the address of the data receiver side.

In other words, the reserve information region 32 is used as the traffic class information region 42. Geographically hierarchical information (namely, information based on the ISDN address format defined in E.164 shown in FIG. 6) is mapped to regions 47a, 47b, 48a, and 48b. The E.164 portion of an ATM address is contained in the IP address. Thus, when the address conversion table is referenced, the E.164 portion that is in common with addresses can be simply referenced. Consequently, the size of the address conversion table can be suppressed from becoming large.

In addition, as shown in FIG. 6, the E.164 portion is address information that is geographically hierarchized. Thus, when the contents of the routing table of each of the routers geographically disposed is hierarchized, the routing table can be simplified. Consequently, since the size of the table to be referenced becomes small, the searching process can be preformed at high speed. Thus, the speed of the routing process can be increased.

In the format of the basic header of the Internet protocol shown in FIG. 7, when the contents of the flow label information region 33 is a condition for processing an IP datagram and the condition is accomplished on the ATM network side, the IP datagram should be converted corresponding to the type of QoS and a parameter thereof. Thus, the assurance of communication quality and the identification of a CUG can be accomplished unlike with the conventional system.

Figure 9:
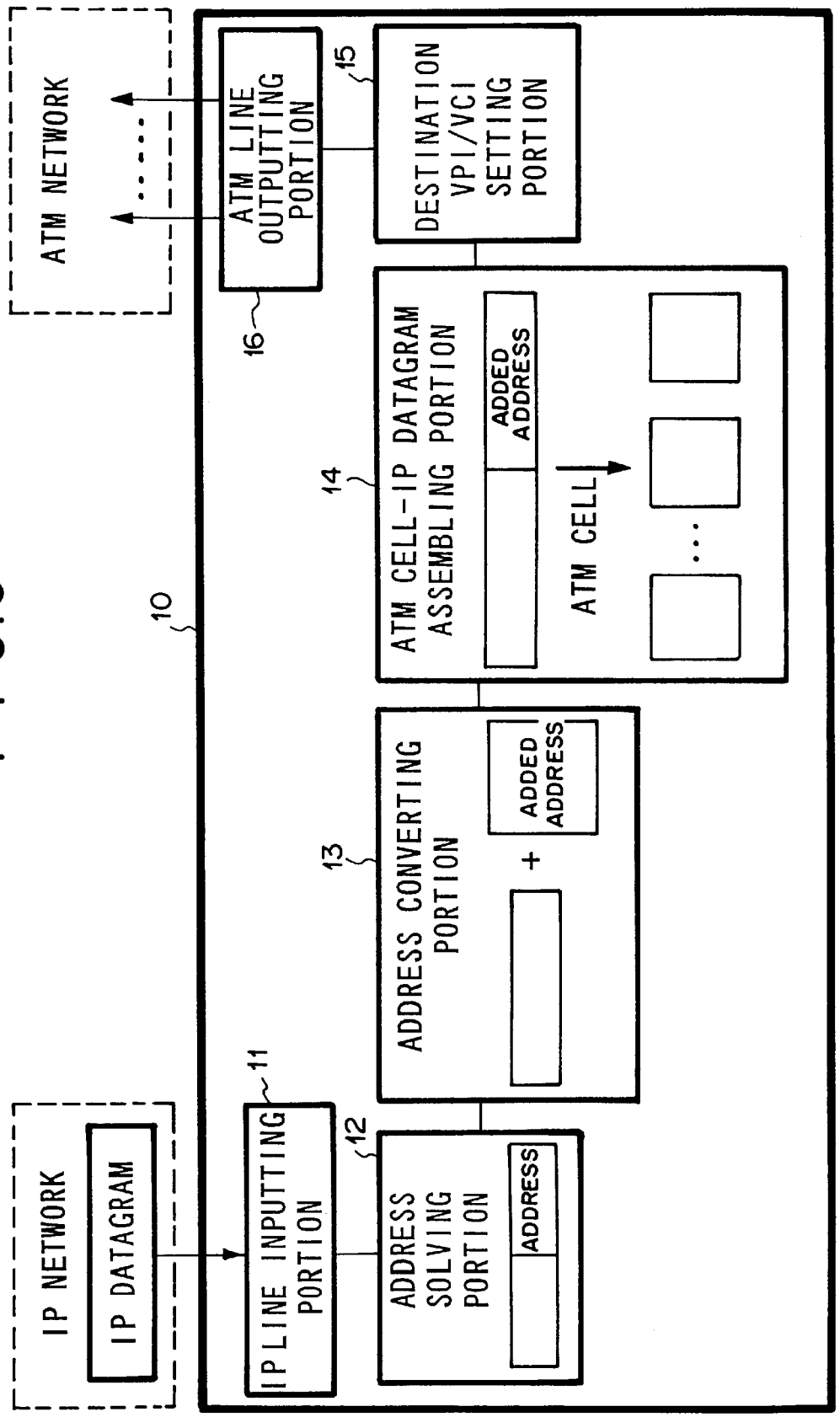
FIG. 9 is a block diagram showing principal portions of an IP-ATM converting portion of the IP-ATM node according to the embodiment of the present invention.
Figure 10:
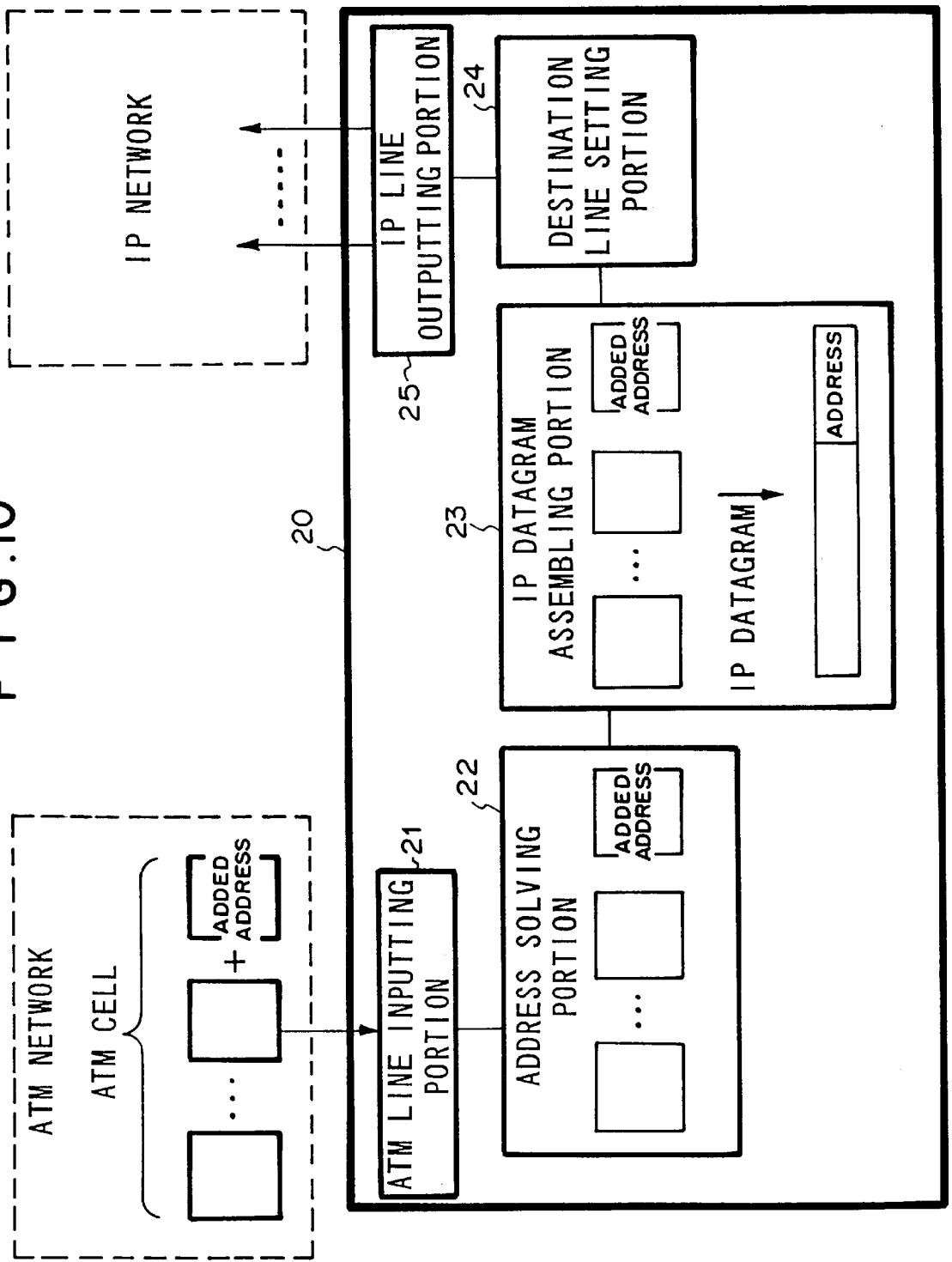
FIG. 10 is a block diagram showing principal portions of an ATM-IP converting portion of the IP-ATM node according to the embodiment of the present invention.

FIGS. 9 and 10 show structures of principal portions of an IP-ATM node. FIG. 9 shows the structure of principal portions of an IP-ATM converting portion. FIG. 10 shows the structure of principal portions of an ATM-IP converting portion. The IP-ATM converting portion shown in FIG. 9 comprises an IP line inputting portion 11, an address solving portion (first address solving means) 12, an address converting portion (address converting means) 13, an ATM cell—IP datagram assembling portion (ATM cell assembling means) 14, a destination VPI/VCI setting portion (first transfer destination setting and outputting means) 15, and an ATM line outputting portion (first transfer destination setting and outputting means) 16.

The IP line inputting portion 11 inputs an IP datagram received from the IP network through a data transmission path. The address solving portion 12 extracts an address portion from an IP datagram that has been input and converts the address portion into an MAC (Medium Access Control) address so as to solve (obtain) an address in the ATM network. The address converting portion 13 converts the address solved (obtained) by the address solving portion 12 corresponding to the format of the added header and adds the converted address.

The ATM cell—IP datagram assembling portion 14 assembles an ATM cell with the IP datagram having the new address added. When assembling an ATM cell, the ATM cell—IP datagram assembling portion 14 uses the format of the base header of the Internet protocol IPv6 so that the added address is contained in one ATM cell (48 bytes). The transfer destination VPI/VCI setting portion 15 selectively sets a path (VPI/VCI) corresponding to the destination. The ATM line outputting portion 16 sends an ATM cell to a destination that has been set by the transfer destination VPI/VCI setting portion 15 through a data transmission path of the ATM network.

On the other hand, the ATM-IP converting portion 20 shown in FIG. 10 comprises an ATM line inputting portion 21, an address solving portion (second address solving means) 22, an IP datagram assembling portion (datagram assembling means) 23, a destination line setting portion (second transfer destination setting and outputting means) 24, and an IP line outputting portion (second transfer destination setting and outputting means) 25. The ATM line inputting portion 21 inputs an ATM cell received from the ATM network through a data transmission path. The address solving portion 22 extracts an address portion from an ATM cell that has been input and solves (obtains) an address in the IP network.

The IP datagram assembling portion 23 converts an ATM cell into an AAL packet and assembles an IP datagram. The destination line setting portion 24 extracts an added address from an IP datagram assembled by the IP datagram assembling portion 23 and selectively sets a destination line in the IP network. The IP line outputting portion 25 sends an IP datagram to a destination line that has been set by the destination line setting portion 25 through a data transmission path of the IP network.

Next, with reference to FIGS. 11 and 12, examples of operations of the exchange apparatus according to the embodiment of the present invention will be described.

Figure 11:
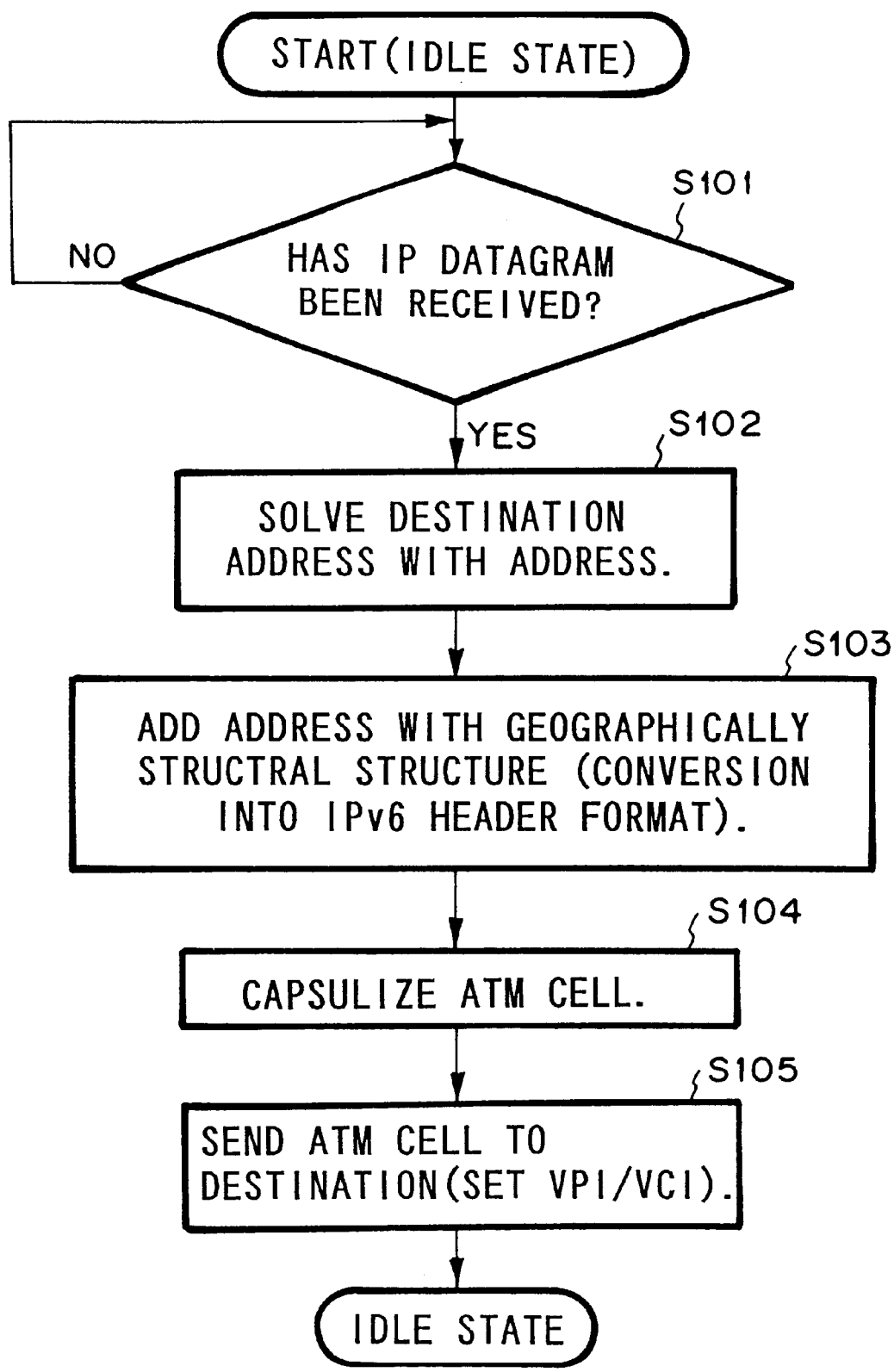
FIG. 11 is a flow chart for explaining an example of the operation of the IP-ATM converting portion shown in FIG. 9.

FIG. 11 is a flow chart for explaining an example of the operation of the IP-ATM converting portion shown in FIG. 9. When the address solving portion 12 is in an idle state, the IP-ATM converting portion 10 determines whether or not an IP datagram has been received from the IP network through the IP line inputting portion 11 (at step S101). When an IP datagram has not been received (namely, the determined result at step S101 is No), the IP-ATM converting portion 10 continues the determining process at step S101 until it receives an IP datagram.

On the other hand, when an IP datagram has been received (namely, the determined result at step S101 is Yes), the address solving portion 12 solves (obtains) address information that has a geographically hierarchical structure of the transfer destination corresponding to E.164 with the address information of the IP datagram and supplies the solved address information to the address converting portion 13 (at step S102). The address converting portion 13 converts the address information of the transfer destination corresponding to E.164 as an address to be added to the IP datagram into an address portion of the IP datagram and supplies the resultant IP datagram to the ATM cell—IP datagram assembling portion 14 (at step S103).

The ATM cell—IP datagram assembling portion 14 capsulizes the IP datagram with the added address as an ATM cell and supplies the ATM cell to the destination VPI/VCI setting portion 15 (at step S104). The destination VPI/VCI setting portion 15 supplies destination VPI/VCI information represented with the added address to the ATM line outputting portion 16. The ATM line outputting portion 16 outputs the ATM cell to the ATM network (at step S105). Thereafter, the IP-ATM converting portion 10 becomes the idle state.

Figure 12:
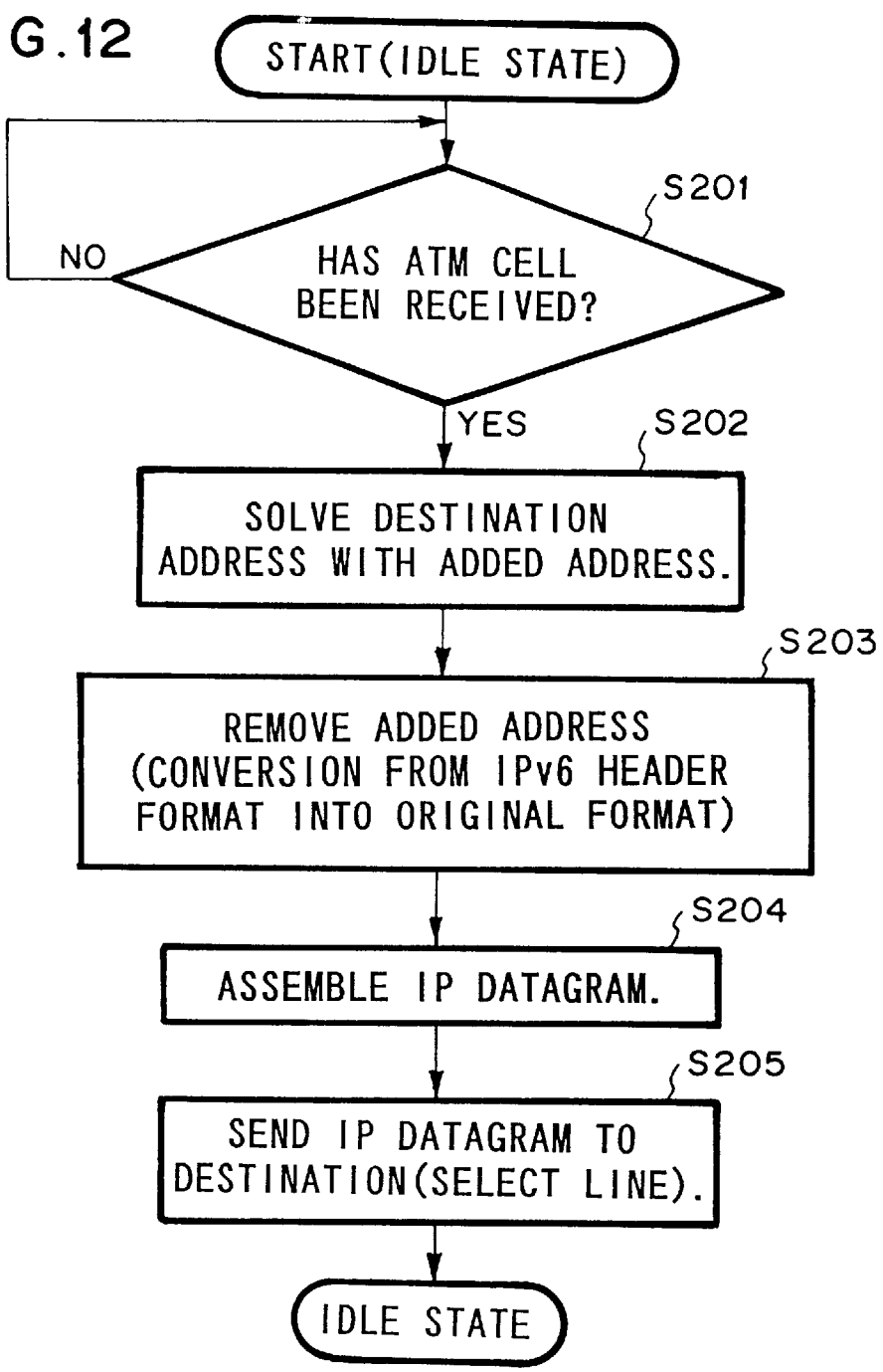
FIG. 12 is a flow chart for explaining an example of the operation of the ATM-IP converting portion shown in FIG. 10.
Figure 13:
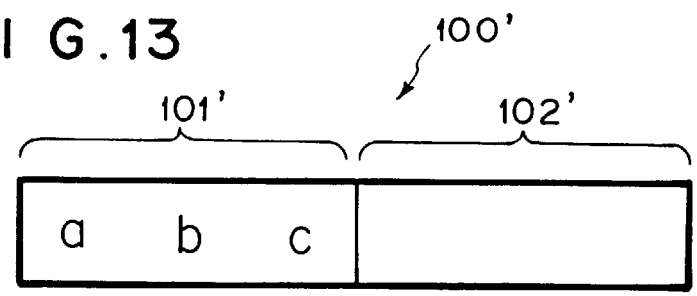
FIG. 13 is a schematic diagram showing an outlined format of packet data transferred in the asynchronous transfer mode.
Figure 14:
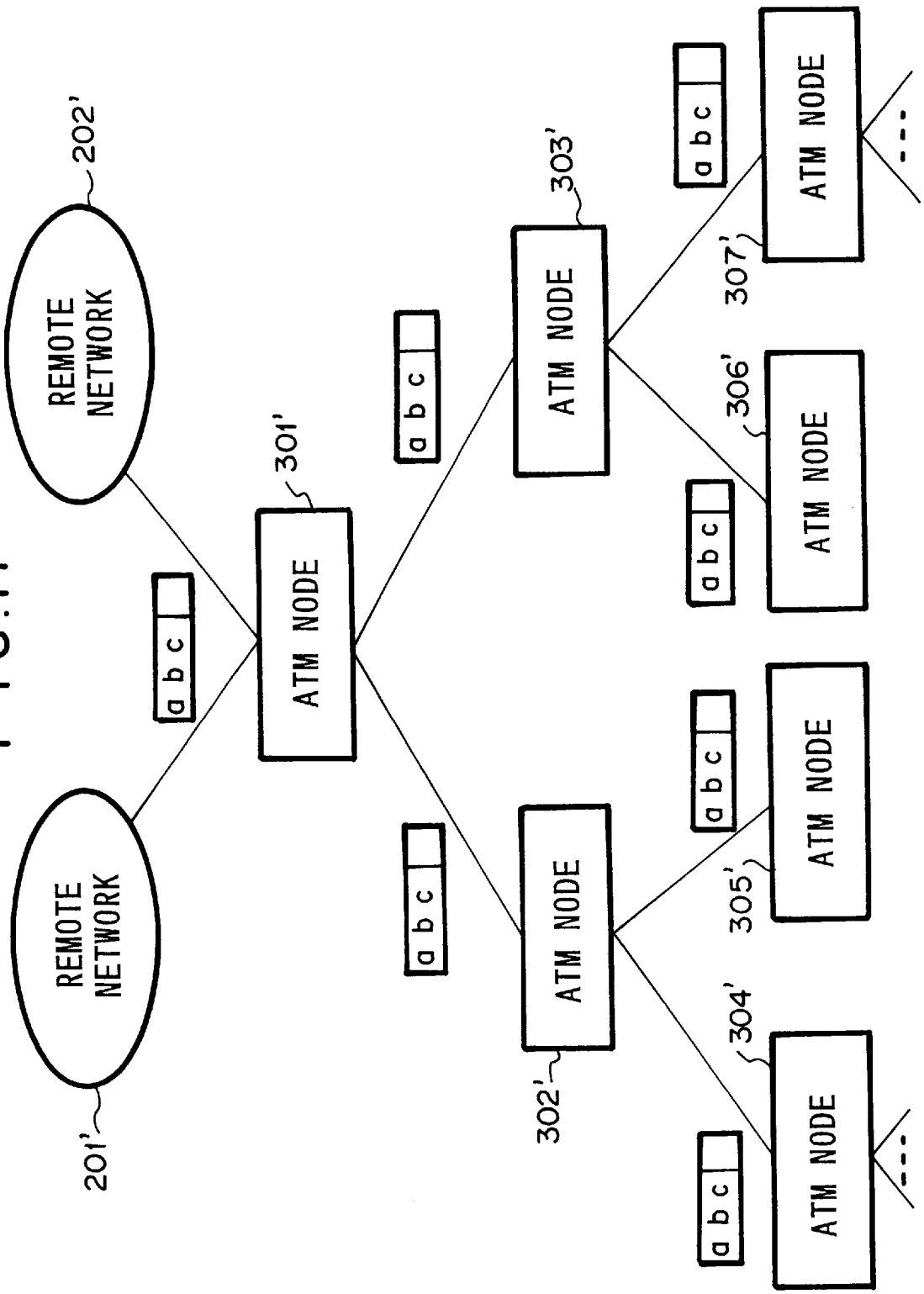
FIG. 14 is a schematic diagram showing the structure of an ATM network.

FIG. 12 is a flow chart for explaining an example of the operation of the ATM-IP converting portion shown in FIG. 10. When the address solving portion 22 is in an idle state, the ATM-IP converting portion 20 determines whether or not an ATM cell has been received from the ATM network through the ATM line inputting portion 21 (at step S201). When an ATM cell has not been received (namely, the determined result at step S201 is No), the ATM-IP converting portion 20 continues the determining process at step S201 until it receives an ATM cell.

On the other hand, when an ATM cell has been received (namely, the determined result at step S201 is Yes), the address solving portion 22 assembles the received ATM cell, solves an address of the destination with the added address of the ATM cell, and supplies the address to the IP datagram assembling portion 23 (at step S202). The IP datagram assembling portion 23 converts the added address into the original address information and removes the added address (at step S203). Thereafter, the IP datagram assembling portion 23 assembles an IP datagram and supplies the IP datagram to the destination line setting portion 24 (at step S204).

The destination line setting portion 24 supplies the destination line information represented with the address of the IP datagram to the IP line outputting portion 25. The IP line outputting portion 25 supplies the IP datagram assembled by the IP datagram assembling portion 23 to the IP network (at step S205). Thereafter, the ATM-IP converting portion 20 becomes the idle state.

As described above, according to the embodiment, address information having a geographically hierarchical structure corresponding to E.164 is used as address information of the destination used in the ATM network. Thus, just with reference to address information, a geographical location of the transfer destination can be obtained. Each IP-ATM node 2 does not need to have a routing table for the entire network. Thus, since it is not necessary to search the routing table for address information of the IP-ATM node 2 at each transit point. Thus, the transmission time can be shortened.

In addition, since each IP-ATM node 2 requires to have routing tables in just higher and lower hierarchical levels of the current hierarchical level, the storage capacity of the table can be decreased. Moreover, the load of the table searching process can be alleviated.

When address information contains communication quality type identification information and CUG identification information, the user side does not require a special protocol. Thus, the QoS control and CUG service can be accomplished in the ATM network.

As described above, according to the present invention, an ATM address is designated with an ISDN address corresponding to E.164. On the other hand, an IP address is mapped in the address format of the Internet protocol IPv6 corresponding to E.164. In reality, when an address is assigned in a geographically hierarchical structure, only by solving an ATM address from an IP address, a geographical location of the communication party can be obtained. Thus, data can be immediately transferred to the transmission party.

By correlating address information in a geographically hierarchical structure, table data of address information and path information can be distributively managed in each hierarchical level. Thus, the data size of the address information and the path information can be decreased.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An exchange apparatus, comprising:

address solving means for extracting logical address information from a datagram received from an Internet protocol computer network through a data transmission path and converting the extracted address information into absolute address information of an asynchronous transfer mode network;

address converting means for converting the absolute address information converted by said address solving means into an address having a geographically hierarchical structure and adding the converted address information to the original datagram;

ATM cell assembling means for assembling an ATM cell that is transferred at a time in the asynchronous transfer mode with the datagram containing the address information added by said address converting means; and transfer destination setting and outputting means for setting a virtual path and a virtual channel that represent the transfer destination to the ATM cell assembled by said ATM cell assembling means and outputting the resultant ATM cell to the asynchronous transfer mode network, wherein said exchange apparatus is provided at a particular network hierarchical level, and wherein said address converting means converts the absolute address information into the address having a geographical hierarchical structure by referring to a routing table that includes routing information of only the particular network hierarchical level and network hierarchical levels immediately above and immediately below the particular network hierarchical level, and wherein the routing table does not include routing information of any other network hierarchical levels.

2. The exchange apparatus as set forth in claim 1,
wherein said address converting means converts the solved address information into ISDN address information having a hierarchical structure defined in E.164 of the ISDN address format and address information based thereon.

3. An exchange apparatus, comprising:
address solving means for extracting logical address information from a datagram received from an Internet protocol computer network through a data transmission path and converting the extracted address information into absolute address information of an asynchronous transfer mode network;

address converting means for converting the absolute address information converted by said address solving means into an address having a geographically hierarchical structure and adding the converted address information to the original datagram;

ATM cell assembling means for assembling an ATM cell that is transferred at a time in the asynchronous transfer mode with the datagram containing the address information added by said address converting means; and transfer destination setting and outputting means for setting a virtual path and a virtual channel that represent the transfer destination to the ATM cell assembled by said ATM cell assembling means and outputting the resultant ATM cell to the asynchronous transfer mode network, wherein the datagram is composed of a version information region for representing the version of the Internet protocol, a reserve information region, a flow label information region for identifying a flow to which a packet belongs, a payload length information region for representing the size of a data portion of a packet, a next header information region preceded by an Information protocol header, a hop limit information region for representing the number of hops, a source address information region for designating the address of a data transmission side, and a destination information region for designating the address of a data receiver side that are arranged in the order.

4. An exchange apparatus, comprising:
address solving means for extracting logical address information from a datagram received from an Internet protocol computer network through a data transmission path and converting the extracted address information into absolute address information of an asynchronous transfer mode network;

address converting means for converting the absolute address information converted by said address solving means into an address having a geographically hierarchical structure and adding the converted address information to the original datagram;

ATM cell assembling means for assembling an ATM cell that is transferred at a time in the asynchronous transfer mode with the datagram containing the address information added by said address converting means; and transfer destination setting and outputting means for setting a virtual path and a virtual channel that represent the transfer destination to the ATM cell assembled by said ATM cell assembling means and outputting the resultant ATM cell to the asynchronous transfer mode network, wherein the absolute address information is composed of a version information region for representing the version of an Internet protocol, a traffic class information region for representing the class of the traffic, a flow label information region for identifying a flow to which a packet belongs, a payload length information region for representing the size of a data portion of a packet, a next header information region preceded by an Internet protocol header, a hop limit information region for representing the number of hops, a source address information region for designating the address of a data transmission side, and a destination information region for designating the address of a data receiver side that are arranged in the order.

5. The exchange apparatus as set forth in claim 4,
wherein the source address information region and the destination information region contain geographically hierarchical information.

6. An exchange apparatus, comprising:
address solving means for extracting logical address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information;

datagram assembling means for assembling a datagram in an ATM adaptation layer with the ATM cell whose address has been solved by said address solving means; and transfer destination setting and outputting means for setting a virtual path and a virtual channel that represent the transfer destination for the ATM cell assembled by said datagram assembling means and outputting the resultant ATM cell to the Internet protocol computer network, wherein said exchange apparatus is provided at a particular network hierarchical level, and wherein said address solving means converts the address information into the absolute address information in the Internet Protocol by referring to a routing table that includes routing information of only the particular network hierarchical level and network hierarchical levels immediately above and immediately below the particular network hierarchical level, and wherein the routing table does not include routing information of any other network hierarchical levels.

7. An exchange apparatus, comprising:
address solving means for extracting logical address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information;

datagram assembling means for assembling a datagram in an ATM adaptation layer with the ATM cell whose address has been solved by said address solving means; and transfer destination setting and outputting means for setting a virtual path and a virtual channel that represent the transfer destination for the ATM cell assembled by said datagram assembling means and outputting the resultant ATM cell to the Internet protocol computer network, wherein the datagram is composed of a version information region for representing the version of the Internet protocol, a reserve information region, a flow label information region for identifying a flow to which a packet belongs, a payload length information region for representing the size of a data portion of a packet, a next header information region preceded by an Information protocol header, a hop limit information region for representing the number of hops, a source address information region for designating the address of a data transmission side, and a destination information region for designating the address of a data receiver side that are arranged in the order.

8. An exchange apparatus, comprising:

address solving means for extracting logical address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information;

datagram assembling means for assembling a datagram in an ATM adaptation layer with the ATM cell whose address has been solved by said address solving means; and transfer destination setting and outputting means for setting a virtual path and a virtual channel that represent the transfer destination for the ATM cell assembled by said datagram assembling means and outputting the resultant ATM cell to the Internet protocol computer network, wherein the absolute address information is composed of a version information region for representing the version of an Internet protocol, a traffic class information region for representing the class of the traffic, a flow label information region for identifying a flow to which a packet belongs, a payload length information region for representing the size of a data portion of a packet, a next header information region preceded by an Internet protocol header, a hop limit information region for representing the number of hops, a source address information region for designating the address of a data transmission side, and a destination information region for designating the address of a data receiver side that are arranged in the order.

9. The exchange apparatus as set forth in claim 8, wherein the source address information region and the destination information region contain geographically hierarchical information.

10. An exchange apparatus, comprising:

first address solving means for extracting logical address information from a datagram received from an Internet protocol computer network through a data transmission path and converting the extracted address information into absolute address information of an asynchronous transfer mode network;

address converting means for converting the absolute address information converted by said first address solving means into an address having a geographically hierarchical structure and adding the converted address information to the original datagram;

ATM cell assembling means for assembling an ATM cell that is transferred at a time in the asynchronous transfer mode with the datagram containing the address information added by said address converting means;

first transfer destination setting and outputting means for setting a virtual path and a virtual channel that represent the transfer destination to the ATM cell assembled by said ATM cell assembling means and outputting the resultant ATM cell to the asynchronous transfer mode network;

second address solving means for extracting logical address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information;

datagram assembling means for assembling a datagram in an ATM adaptation layer with the ATM cell whose address has been solved by said second address solving means; and second transfer destination setting and outputting means for setting a virtual path and a virtual channel that represent the transfer destination for the ATM cell assembled by said datagram assembling means and outputting the resultant ATM cell to the Internet protocol computer network, wherein said exchange apparatus is provided at a particular network hierarchical level, and wherein said address converting means converts the absolute address information into the address having a geographical hierarchical structure by referring to a routing table that includes routing information of only the particular network hierarchical level and network hierarchical levels immediately above and immediately below the particular network hierarchical level, and wherein the routing table does not include routing information of any other network hierarchical levels.

11. The exchange apparatus as set forth in claim 10, wherein said address converting means converts the solved address information into ISDN address information having a hierarchical structure defined in E.164 of the ISDN address format and address information based thereon.

12. An exchange apparatus, comprising:

first address solving means for extracting logical address information from a datagram received from an Internet protocol computer network through a data transmission path and converting the extracted address information into absolute address information of an asynchronous transfer mode network;

address converting means for converting the absolute address information converted by said first address solving means into an address having a geographically hierarchical structure and adding the converted address information to the original datagram;

ATM cell assembling means for assembling an ATM cell that is transferred at a time in the asynchronous transfer mode with the datagram containing the address information added by said address converting means;

first transfer destination setting and outputting means for setting a virtual path and a virtual channel that represent the transfer destination to the ATM cell assembled by said ATM cell assembling means and outputting the resultant ATM cell to the asynchronous transfer mode network;

second address solving means for extracting logical address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information;

datagram assembling means for assembling a datagram in an ATM adaptation layer with the ATM cell whose address has been solved by said second address solving means; and second transfer destination setting and outputting means for setting a virtual path and a virtual channel that represent the transfer destination for the ATM cell assembled by said datagram assembling means and outputting the resultant ATM cell to the Internet protocol computer network, wherein the datagram is composed of a version information region for representing the version of the Internet protocol, a reserve information region, a flow label information region for identifying a flow to which a packet belongs, a payload length information region for representing the size of a data portion of a packet, a next header information region preceded by an Information protocol header, a hop limit information region for representing the number of hops, a source address information region for designating the address of a data transmission side, and a destination information region for designating the address of a data receiver side that are arranged in the order.

13. An exchange apparatus, comprising:

first address solving means for extracting logical address information from a datagram received from an Internet protocol computer network through a data transmission path and converting the extracted address information into absolute address information of an asynchronous transfer mode network;

address converting means for converting the absolute address information converted by said first address solving means into an address having a geographically hierarchical structure and adding the converted address information to the original datagram;

ATM cell assembling means for assembling an ATM cell that is transferred at a time in the asynchronous transfer mode with the datagram containing the address information added by said address converting means;

first transfer destination setting and outputting means for setting a virtual path and a virtual channel that represent the transfer destination to the ATM cell assembled by said ATM cell assembling means and outputting the resultant ATM cell to the asynchronous transfer mode network;

second address solving means for extracting logical address information from an ATM (Asynchronous Transfer Mode) cell that is transferred at a time in an asynchronous transfer mode and that is received from an asynchronous transfer mode network through a data transmission path and converting the address information into absolute address information in an Internet protocol computer network corresponding to the extracted logical address information;

datagram assembling means for assembling a datagram in an ATM adaptation layer with the ATM cell whose address has been solved by said second address solving means; and second transfer destination setting and outputting means for setting a virtual path and a virtual channel that represent the transfer destination for the ATM cell assembled by said datagram assembling means and outputting the resultant ATM cell to the Internet protocol computer network, wherein the absolute address information is composed of a version information region for representing the version of an Internet protocol, a traffic class information region for representing the class of the traffic, a flow label information region for identifying a flow to which a packet belongs, a payload length information region for representing the size of a data portion of a packet, a next header information region preceded by an Internet protocol header, a hop limit information region for representing the number of hops, a source address information region for designating the address of a data transmission side, and a destination information region for designating the address of a data receiver side that are arranged in the order.

14. The exchange apparatus as set forth in claim 13, wherein the source address information region and the destination information region contain geographically hierarchical information.

* * * * *